Nov. 10, 1931. R. E. JOHNSTON 1,831,356
DIRIGIBLE SPOTLIGHT
Filed Nov. 1, 1928
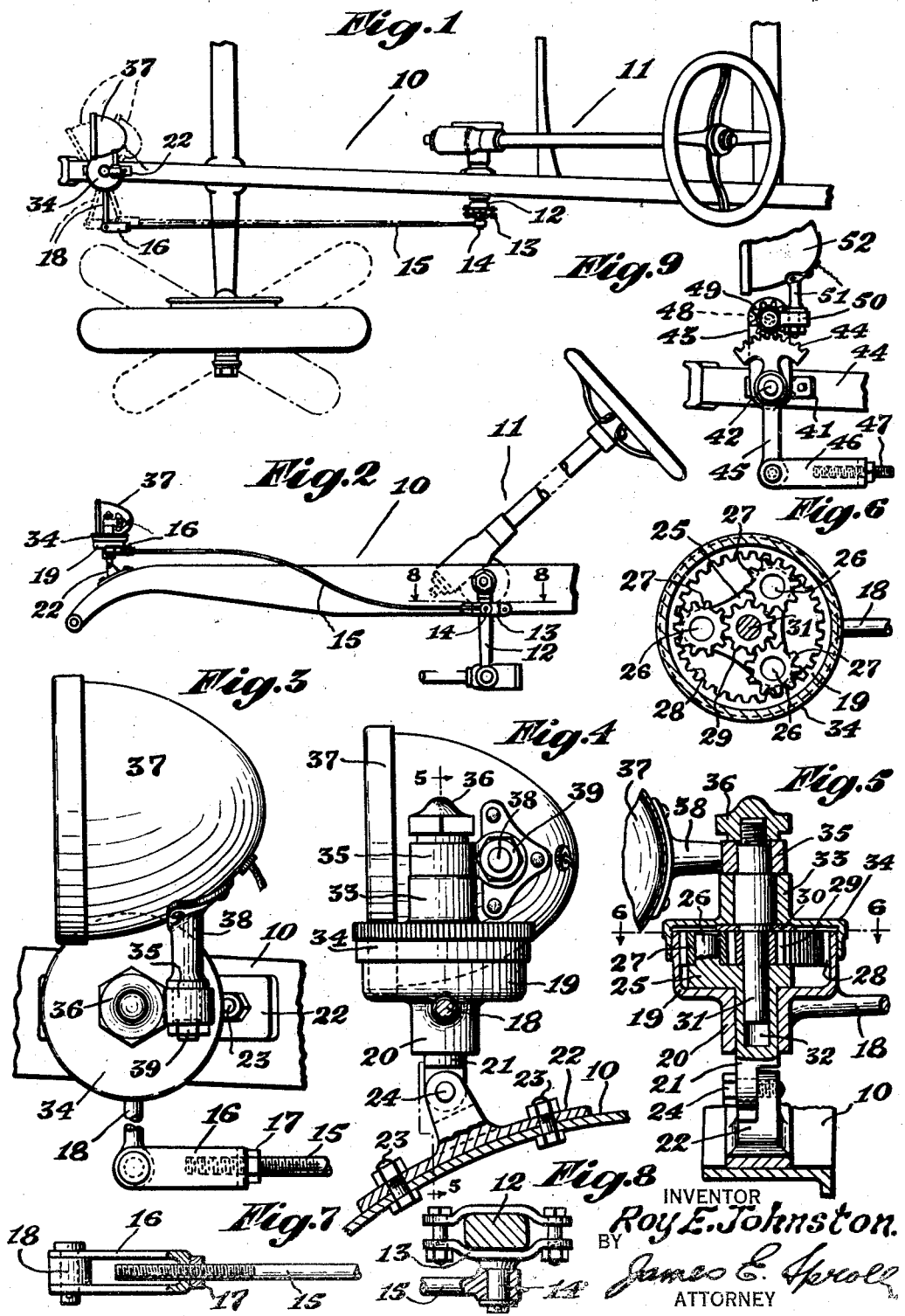
INVENTOR
Roy E. Johnston.
BY
James E. Sproll
ATTORNEY Patented Nov. 10, 1931

1,831,356

UNITED STATES PATENT OFFICE

ROY E. JOHNSTON, OF SEATTLE, WASHINGTON

DIRIGIBLE SPOTLIGHT

Application filed November 1, 1928. Serial No. 316,449.

This invention relates to dirigible spotlights for automotive vehicles and aims primarily to provide a dirigible spotlight especially designed and adaptable for use with and attachment to any make or type of automotive vehicle for actuation by the steering arm thereof, whereby the spotlight will be caused to turn simultaneously with and in the same direction as the vehicle front wheels, so that the light rays from said spotlight will be projected in the direction of travel of the vehicle.

Contemplated by the present invention is a dirigible spotlight embodying means for adjustably connecting same to the steering arm of its correlated vehicle, whereby turning movement or throw of the spotlight may be varied as desired; longitudinal adjustable means to adapt the spotlight for use on cars of various makes; mechanism whereby the spotlight is turned in the reverse direction to the movement of its correlated steering or pitman arm; means for angularly adjusting the spotlight in horizontal and vertical planes; and means for tiltably mounting the spotlight upon the vehicle to adapt such spotlight for use on chassis frames having different angles and curvatures, all of which are important objects of the invention and are to be correlated in the broad aim of enhancing the efficiency of the device for general use.

The above, and additional objects which will be hereinafter more specifically treated, are attained by such means as are shown in the accompanying drawings, described in the following specification and then more clearly pointed out in the claims, which are appended hereto, and form a part of this application.

With reference to the drawings in which there are illustrated several embodiments of the invention, and throughout the several views of which like characters of reference designate similar parts, Figure 1 is a fragmentary plan view of an automotive vehicle chassis having a dirigible spotlight of the type comprehended by the present invention operatively mounted thereon.

Fig. 2 is a fragmentary side elevation of the same.

Fig. 3 is an enlarged plan view of the dirigible spotlight.

Fig. 4 is a side elevation of the same, certain parts being broken away.

Fig. 5 is a vertical transverse section taken through 5—5 of Fig. 4.

Fig. 6 is a horizontal section taken through 6—6 of Fig. 5.

Fig. 7 is an enlarged fragmentary side elevation of the forward end of the spotlight actuating rod or pitman.

Fig. 8 is a horizontal section taken through 8—8 of Fig. 2, and

Fig. 9 is a plan view of a slightly modified type of spotlight actuating mechanism.

Beginning the more detailed description by reference to the drawings, the numeral 10 designates an automotive vehicle chassis, 11 the vehicle steering gear, and 12 the steering or pitman arm thereof, to which is adjustably secured a clamp 13 having a stub pin 14 projecting laterally therefrom. Pivotally connected at its rear end to the pin 14 is a forwardly extending pitman or spotlight actuating rod 15 having a shackle or yoke member 16 threadedly mounted for longitudinal or axial adjustment upon its forward or front end, said shackle being normally locked in longitudinally adjusted positions thereon by a nut 17. The shackle 16 at its forward end is pivotally connected to the outer end of a laterally extending arm 18 integrally formed or otherwise rigidly secured at its inner end to a vertically disposed cylindrical casing 19 having a depending central boss or hub 20 mounted for oscillative movement upon the upper end of an angularly adjustable stem 21, the axis of which is normally disposed in a vertical plane, and which is tiltably mounted at its lower end upon a bracket 22 rigidly secured, as by bolts 23, to the forward end of the vehicle chassis 10. The stem 21 is clamped to the bracket 22 in the selected angular position relative thereto by a pin 24, which passes through said stem and is threadedly engaged within said bracket, as more clearly shown in Fig. 5.

Integrally formed upon the upper end of the stem 21 is a flange 25, the lower face of which normally abuts the inner side of the lower end wall of the casing 19, while the upper face of said flange is provided with upwardly projecting pins 26, whereon are rotatively mounted planetary pinions 27, which mesh with an internal or ring gear 28 formed upon the cylindrical wall of the casing 19 adjacent its upper end. Intermeshing with the planetary pinions 27 is a central pinion 29, which together with a superposed spacing washer 30 is pressed upon and is rigidly secured to a vertically disposed oscillative shaft 31, at a point substantially midway its height, the portion of said shaft below the pinion 29 being journalled within an axial recess 32 formed within the upper end of the stem 21, while the portion of said shaft above and adjacent to the washer 30 is journalled within a central boss or hub 33 formed upon a cover or closure 34 threadedly secured upon the upper end of the casing 19. The upper end portion of the shaft 30 projects above the boss 32 to receive a rearwardly extending arm 35, which latter is clamped to said shaft by a clamping nut 36 threadedly engaged upon the upper terminal thereof.

The numeral 37 designates a spotlight, of any well known type, having a shank 38 extending therefrom, the outer end of which is mounted for rotative adjustment within the rear end of the arm 35 and clamped thereto by a nut 39.

In attaching the spotlight to the vehicle, the bracket 22 is secured to the vehicle chassis in the desired or selected position thereon, following which the stem 21 is clamped thereto with its axis in a vertical plane, the arm 35 is then adjusted to dispose the axis of the spotlight 37 in a plane parallel to the longitudinal axis of the vehicle with the vehicle front wheels in a straight line, following which the shank 38 is adjusted within the arm 35 to dispose the spotlight axis in a substantially horizontal plane, the clamp 13 is then secured upon the steering or pitman arm 12 in the desired position, and the pitman 15 connected thereto at its rear end and at its forward end is longitudinally adjusted by the shackle 16 to fit the particular vehicle prior to its attachment to the arm 18. From the foregoing, it will be evident that the spotlight is rapidly and readily attached to any type of automotive vehicle, and similarly detached therefrom, and when attached is expeditiously adjusted in any angular position in either a horizontal or vertical plane, also the throw or turning movement of the spotlight 37 may be readily varied by adjusting the clamp 13 upon the steering or pitman arm 12. It will also be apparent from the foregoing and by reference to the accompanying drawings, that the manner of mounting the device upon the vehicle chassis, herein shown and described, substantially eliminates and precludes any vibration of the spotlight, and in consequence the latter will not become loose or wobbly, as has occurred heretofore in dirigible lights of various types.

In the operation of the dirigible spotlight, movements of the steering or pitman arm 12, during steering of the vehicle, impart reciprocative movement to the pitman 15, oscillative movement to the arm 18 and casing 19, which latter imparts oscillative movement to the planetary pinions 27, which impart similar movement to the central pinion 29 and shaft 30 causing oscillations of the arm 35, whereby the spotlight 37 is turned in a direction opposite to the movement of the steering arm 12 and in the same direction as the front wheels of the vehicle.

In the slightly modified type of dirigible spotlight shown in Fig. 9, the numeral 40 designates a vehicle chassis, to the forward end of which is fixedly secured a bracket 41 having a shaft 42 tiltably connected thereto and extending upwardly therefrom in a substantially vertical plane. Rigidly secured to the shaft 42 adjacent its upper end is an inwardly extending bracket member 43 and superposed upon said member is a segmental gear 44, which is mounted for oscillative movement upon the upper terminal of said shaft 42, and is provided with an outwardly extending integral arm 45, to the outer end of which is pivotally connected a shackle 46 adjustably secured to the forward end of a pitman 47 connected at its rear or opposite end to the vehicle steering arm, not shown. Mounted for oscillation within the inner end of the bracket member 43 is a vertically disposed upwardly extending shaft 48 having a pinion 49 fixedly secured thereto and adapted to mesh with the segmental gear 44. Clamped to the upper terminal portion of the shaft 48 is a rearwardly extending arm 50, within the rear end of which is mounted for rotative adjustment a shank 51 of a spotlight 52. Obviously, reciprocative movements of the pitman 47 will actuate the segmental gear 44 and pinion 49 to throw the spotlight 52 in the desired direction.

It will be noted by referring to the accompanying drawings, that the spotlights 37 and 52 due to the manner of fabrication and mounting the same upon the vehicles will move or turn in the reverse direction to the movements of their correlated steering or pitman arms, for the reason that such arms move in a forward direction during left turn movements of the vehicles and in a rearward direction during right turn movements of the same, consequently, it is therefore necessary and essential to provide and interpose mechanism between the steering arms and spotlights, whereby the latter turn in a reverse direction to the former, so that the spotlights will turn or be thrown in the direction of movement of the vehicle front wheels.

In practice the casing 19 is filled with a suitable grease compound to lubricate the several operative elements of the mechanism enclosed therein, and thus materially eliminate any undue friction therebetween and assure of an easy operating mechanism.

Manifestly, therefore, the present devices are relatively simple and economical in construction, durable in use, will not readily get out of order, and are readily adaptable for use with and attachment to any make or type of automotive vehicle, without change, except that the method of attaching the brackets to the vehicle chassis may be varied to conform to the particular make or type of vehicle, the shackles 16 being adjusted upon their correlated pitmans 15 to accommodate the particular vehicle.

What I claim as my invention and desire to secure by Letters Patent is:—

1. The combination with an automotive vehicle, of a steering pitman arm, a bracket rigidly secured to the vehicle, a dirigible spotlight tiltably mounted upon said bracket for adapting same for use on vehicles having different angles and curvatures, means connecting the steering pitman arm with the spotlight at a point thereon above its tiltable mounting for effecting turning movement of the spotlight during steering movements of the pitman arm, and means for tilting the spotlight independently of said first mentioned tiltable mounting.

2. The combination with an automotive vehicle, of a steering pitman arm, a bracket rigidly secured to the vehicle, a dirigible spotlight tiltably mounted upon said bracket for adapting same for use on vehicles having different angles and curvatures, means adjustably mounted upon the steering pitman arm for connecting the same with the spotlight at a point thereon above its tiltable mounting for effecting selective turning movement of the spotlight during steering movements of the pitman arm, and means for tilting the spotlight independently of said first mentioned tiltable mounting.

3. The combination with an automotive vehicle, of a steering pitman arm, a bracket rigidly secured to the vehicle, a dirigible spotlight tiltably mounted upon said bracket for adapting same for use on vehicles having different angles and curvatures, longitudinally adjustable means connecting the steering pitman arm with the spotlight at a point thereon above its tiltable mounting for effecting turning movements of the spotlight during steering movements of the pitman arm, and means for tilting the spotlight independently of said first mentioned tiltable mounting.

4. The combination with an automotive vehicle, of a steering pitman arm, a bracket rigidly secured to the vehicle, a dirigible spotlight tiltably mounted upon said bracket for adapting same for use on vehicles having different angles and curvatures, means connecting the steering pitman arm with the spotlight at a point thereon above its tiltable mounting for effecting turning movement of the spotlight during steering movements of the pitman arm, and means for angularly adjusting the axis of said spotlight in horizontal and vertical planes independently of and above its tiltable mounting and its point of connection with the steering pitman arm.

5. The combination with an automotive vehicle, of a steering pitman arm, a bracket rigidly secured to the vehicle, an oscillating gear casing tiltably mounted upon said bracket, means connecting the steering pitman arm with said gear casing for effecting oscillative movement of the same during steering movements of the pitman arm, and a spotlight tiltably mounted upon said gear casing and adapted to oscillate therewith.

6. The combination with an automotive vehicle, of a steering pitman arm, a bracket rigidly secured to the vehicle, an angularly adjustable stem tiltably mounted upon said bracket, a casing mounted for oscillative movement upon said stem, means connecting the steering pitman arm with said casing for effecting oscillative movement of the same during steering movements of the pitman arm, an oscillative shaft co-axial with and journalled within said stem and casing, gearing interconnecting said stem, casing and shaft, a spotlight mounted upon said shaft adapted to oscillate therewith, and means interposed between the shaft and spotlight for angularly adjusting the axis of the latter in horizontal and vertical planes.

In testimony whereof I affix my signature.

ROY E. JOHNSTON.